March 29, 1927.
E. E. YOUNG
RELIEF VALVE FOR GAS ENGINES
Filed Jan. 8, 1925
1,622,937
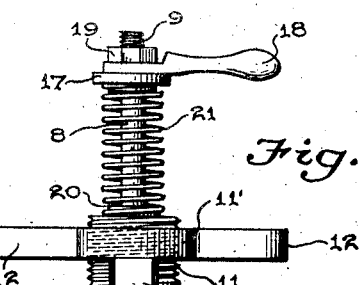
Fig. 1.
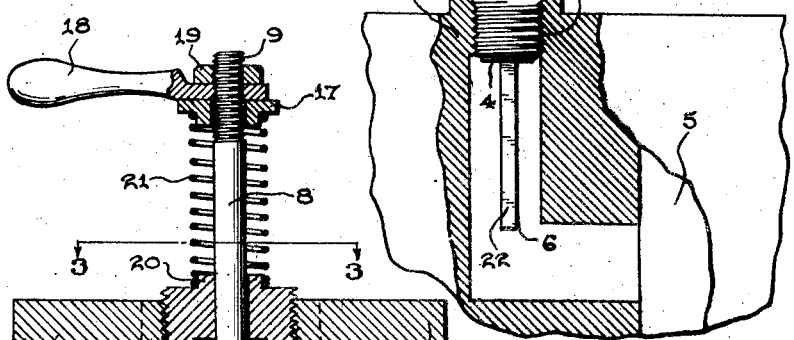
Fig. 2.
Fig. 3.
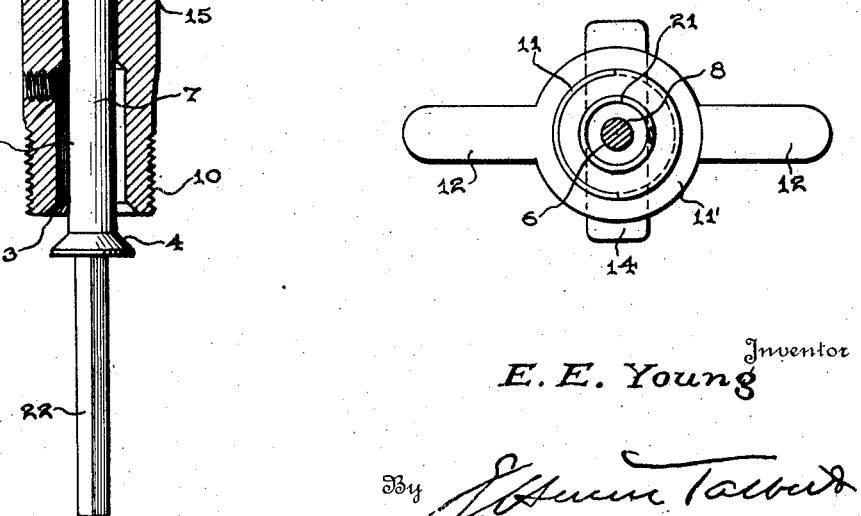
E. E. Young, Inventor
By *[signature]* Attorney Patented Mar. 29, 1927.

1,622,937

UNITED STATES PATENT OFFICE.

ERNEST E. YOUNG, OF SOURLAKE, TEXAS.

RELIEF VALVE FOR GAS ENGINES.

Application filed January 8, 1925. Serial No. 1,250.

Heretofore to remove sidiment or carbon which collects around the relief valve of a gas engine cylinder, it has been necessary to remove the valve, clean it and replace it. This takes time and labor and at times it is not convenient to resort to this work.

In view of the above, it is a purpose of the present invention to provide, in a relief valve for gas engines, a construction of valve including means whereby the valve may be moved to an open position for the purpose of permitting the carbon to be blown out without entirely removing the valve.

Another purpose is to provide, in a valve of this kind, a construction including means for breaking up and agitating the carbon or sediment in case the entire passage from the combustion chamber to the oulet of the passage and around the valve seat is filled up with sediment or carbon, and after breaking up the sediment or carbon, the valve may be moved to an open position, as in the manner previously stated, and the sediment or carbon blown out.

Should any sediment or carbon remain on the valve seat, thereby preventing the valve from properly closing, means carried by the valve stem is afforded, whereby the valve may be rotated which will tend to grind or cut away the collection of carbon or sediment and then, as previously stated, the valve may be disposed in an open position and the sediment or carbon blown out.

It is to be understood that the particulars herein given are in no way limitative and that, while still keeping within the scope of the invention, any desired modifications of detail and desired proportions may be made in the apparatus according to the circumstances.

The invention comprises further features and combination of parts to be hereinafter set forth, shown in the drawings and claimed.

In the drawings:

Figure 1 is a view in section of a portion of the wall of a combustion engine, showing the improved valve applied, disclosing the means for opening the valve, the means for rotating the valve for grinding the seat and grinding away the carbon, and the means for agitating the carbon.

Figure 2 is a sectional view showing the valve held open.

Figure 3 is a cross sectional view on line 3—3 of Figure 1.

Referring to the drawings, 1 designates the wall of a portion of an engine cylinder showing a part of the combustion chamber, 2 denotes the valve casing, and 3 the valve seat with which the valve 4 cooperates for closing the port to the combustion chamber 5. The valve 4 is carried by a valve stem 6, the upper part of which is cylindrical where it passes through and beyond the valve casing. The cylindrical part of the valve stem comprises a major portion 7 and a reduced upper portion 8, the latter projecting through and beyond the upper part of the valve casing and being provided with a threaded terminal 9.

The valve casing has its opposite ends threaded at 10 and 11, the former being threaded into the wall of the cylinder and engaged with the latter is a disk 11' provided with opposite radial handles 12. The upper end of the valve casing has an enlarged transverse opening 13 in which an abutment 14 engages. The reduced upper end of the valve stem passes through the abutment 14 which rests on the shoulder 15 where the reduced upper end of the valve stem and the major portion thereof adjoin. The transverse opening 13 is of greater height than the abutment 14 and, due to the tensioning means surrounding the valve stem, the abutment is held in contact with the under face of the disk or ring 11 with the valve closed. The valve casing has the usual port 16 which is located at a position beyond the wall of the combustion chamber.

A shouldered disk 17 is mounted upon the reduced upper end of the valve stem and engaged with the threaded terminal of the valve stem is a handle 18 against which the disk 17 engages, there being a lock nut 19 locked against the upper face of the disk end of the handle for holding the handle in position. The upper end of the valve casing has a reduced portion 20 and engaging therewith and also with the shoulder of the disk 17 and in surrounding relation with the reduced portion of the valve stem is a coil expansion spring 21. This spring acts to hold the valve normally closed.

Obviously, should any carbon or sediment collect on the valve seat or on the valve, the handle 18 may be grasped and the valve stem rotated sufficiently to grind the face of the valve and the seat for the purpose of cracking or crumbling the carbon or sediment. Then by rotating the disk or ring 11 through the medium of the handles 12, the depression of the abutment 14 ensues with the unseating of the valve which may be held open until the carbon or sediment is blown out.

The valve stem 6 extends below as well as above the valve and this lower extension 22 is rectangular in cross section and constitutes an agitator so that, in case the passage from the valve to the combustion chamber proper should become clogged or practically entirely stopped up from carbon or sediment, the valve stem may be rotated, causing the agitator to crumble or loosen the carbon or sediment, whereby it may be blown out when the valve is moved to an open position. The valve may be agitated axially through the casing to further loosen the carbon or sediment.

The invention having been set forth, what is claimed is:

1. A relief valve for gas engines consisting of a valve casing provided with a valve seat, a valve housed within said casing and yieldingly impelled toward said seat, means for imparting angular or turning movement to the valve, and manual means for fixedly disposing said valve in its operating open position, the valve being provided with a stem and the last said means comprising an abutment carried by the stem and movable in a guide opening in the casing, and a member movable axially of the casing and engaging said abutment.

2. A relief valve for gas engines consisting of a valve casing provided with a valve seat, a valve housed within said casing and yieldingly impelled toward said seat, means for imparting angular or turning movement to the valve, manual means for fixedly disposing said valve in its operating open position, the valve being provided with a stem and the last said means comprising an abutment carried by the stem and movable in a guide opening in the casing, and a ring member in surrounding relation to and threadingly engaged with said casing and movable into and out of engagement with said abutment.

3. A relief valve for gas engines comprising a casing with a valve seat and a valve cooperating therewith and provided with a stem, tensioning means cooperating with the stem for maintaining the valve closed, an agitator projecting from and below the valve, means carried by the stem for agitating the stem longitudinally through the casing for crumbling or breaking the carbon, means operatively mounted on the casing and operatively connecting with the valve stem for opening the valve to permit the crumbled carbon or sediment to be blown out, said valve opening means consisting of a guide in the valve casing and an abutment on the stem and operatively mounted in the guide, and means engaging the abutment for opening the valve.

In testimony whereof he affixes his signature.

ERNEST E. YOUNG.